(12) United States Patent
Coates et al.

(10) Patent No.: US 9,623,627 B2
(45) Date of Patent: Apr. 18, 2017

(54) COMPOSITE SOUND ABSORBER

(71) Applicant: Zephyros, Inc., Romeo, MI (US)

(72) Inventors: Michael William Coates, Victoria (AU); Marek Kierzkowski, Victoria (AU); Philip John Gibbons, Victoria (AU)

(73) Assignee: ZEPHYROS, INC., Romeo, MI (US)

( * ) Notice: Subject to any disclaimer, the term of this patent is extended or adjusted under 35 U.S.C. 154(b) by 0 days.

(21) Appl. No.: 14/605,506

(22) Filed: Jan. 26, 2015

(65) Prior Publication Data

US 2015/0129355 A1   May 14, 2015

Related U.S. Application Data

(63) Continuation of application No. 14/013,601, filed on Aug. 29, 2013, now Pat. No. 8,950,549, which is a (Continued)

(51) Int. Cl.
*E04B 1/84* (2006.01)
*B32B 5/26* (2006.01)
(Continued)

(52) U.S. Cl.
CPC ............ *B32B 5/26* (2013.01); *B32B 37/1284* (2013.01); *C09J 5/00* (2013.01); *C09J 7/045* (2013.01); *D04H 1/593* (2013.01); *D04H 13/007* (2013.01); *E04B 1/84* (2013.01); *G10K 11/168* (2013.01); *B60R 13/0815* (2013.01); *C09J 2201/20* (2013.01); *C09J 2201/28* (2013.01);
(Continued)

(58) Field of Classification Search
CPC .......... B32B 5/26; B32B 37/1284; C09J 5/00; E04B 1/82; E04B 2001/742; E04B 2001/2201; E04B 2001/24; Y10T 428/1476; Y10T 428/24851; G10K 11/168
USPC .......................................... 181/294, 290, 291
See application file for complete search history.

(56) References Cited

U.S. PATENT DOCUMENTS 3,061,491 A * 10/1962 Sherrard ................. B32B 27/00
181/290
3,087,571 A * 4/1963 Kerwin, Jr. ............... B64C 1/40
181/208
(Continued)

FOREIGN PATENT DOCUMENTS

GB    2079626    1/1982
JP    60-137528  9/1985
(Continued)

OTHER PUBLICATIONS

Japanese Office Action dated Dec. 17, 2013; Appln. No. JP2011-531302.
(Continued)

*Primary Examiner* — Edgardo San Martin
(74) *Attorney, Agent, or Firm* — The Dobrusin Law Firm, P.C.

(57) ABSTRACT

A sound absorbing material comprising a nonwoven fibrous acoustic insulation material and a flow resistive nonwoven facing, wherein the flow resistive nonwoven facing is bonded to the insulation material and has an air flow resistance of from about 600 to about 1800 Rayls and a surface mass of from about 20 to about 150 g/m$^2$.

16 Claims, 5 Drawing Sheets

Related U.S. Application Data continuation of application No. 13/124,645, filed as application No. PCT/AU2009/001363 on Oct. 16, 2009, now Pat. No. 8,534,419.

(60) Provisional application No. 61/106,113, filed on Oct. 16, 2008, provisional application No. 61/106,488, filed on Oct. 17, 2008.

(51) Int. Cl.

| | | |
|---|---|---|
| G10K 11/168 | (2006.01) | |
| C09J 7/04 | (2006.01) | |
| D04H 13/00 | (2006.01) | |
| B32B 37/12 | (2006.01) | |
| C09J 5/00 | (2006.01) | |
| D04H 1/593 | (2012.01) | |
| E04B 1/82 | (2006.01) | |
| G10K 11/162 | (2006.01) | |
| B60R 13/08 | (2006.01) | |
| E04B 1/74 | (2006.01) | |
| E04B 1/76 | (2006.01) | |

(52) U.S. Cl.
CPC ...... C09J 2400/263 (2013.01); C09J 2433/00 (2013.01); C09J 2483/005 (2013.01); E04B 2001/742 (2013.01); E04B 2001/7687 (2013.01); Y10T 156/10 (2015.01); Y10T 156/1052 (2015.01); Y10T 428/1476 (2015.01); Y10T 428/24851 (2015.01)

(56) References Cited

U.S. PATENT DOCUMENTS

| | | | | |
|---|---|---|---|---|
| 3,160,549 | A * | 12/1964 | Caldwell | B32B 27/00 181/207 |
| 3,193,049 | A * | 7/1965 | Wollek | F16F 9/306 181/208 |
| 3,205,972 | A * | 9/1965 | Stricker | B32B 15/08 156/289 |
| 3,386,527 | A * | 6/1968 | Daubert | E04B 1/82 181/208 |
| 3,977,492 | A | 8/1976 | Hankel | |
| 4,096,007 | A | 6/1978 | Bräunling et al. | |
| 4,287,255 | A * | 9/1981 | Wong | C09J 7/02 427/207.1 |
| 4,299,223 | A * | 11/1981 | Cronkrite | A61F 13/58 156/227 |
| 4,705,715 | A * | 11/1987 | DeCoste, Jr. | B32B 5/24 156/244.11 |
| 4,847,140 | A * | 7/1989 | Jaskowski | B32B 5/06 156/148 |
| 4,988,551 | A * | 1/1991 | Zegler | A47G 27/0437 156/184 |
| 5,128,386 | A | 7/1992 | Rehmer et al. | |
| 5,496,603 | A | 3/1996 | Riedel et al. | |
| 5,613,942 | A | 3/1997 | Lucast et al. | |
| 5,741,829 | A | 4/1998 | Reich et al. | |
| 5,747,131 | A * | 5/1998 | Kreckel | B65B 13/02 156/162 |
| 5,773,080 | A | 6/1998 | Simmons et al. | |
| RE36,323 | E * | 10/1999 | Thompson | B32B 5/02 181/286 |
| 6,238,761 | B1 * | 5/2001 | Jeong | B32B 7/06 156/291 |
| 7,470,339 | B2 * | 12/2008 | Hoffmann, Sr. | B44C 7/08 156/234 |
| 7,500,541 | B2 * | 3/2009 | Schmidt | B60R 13/083 181/290 |
| 7,757,810 | B2 * | 7/2010 | Sparks | E04B 1/86 181/290 |
| 7,757,811 | B2 * | 7/2010 | Fox | B32B 5/26 181/286 |
| 7,837,009 | B2 * | 11/2010 | Gross | B32B 27/12 181/208 |
| 7,867,601 | B2 * | 1/2011 | Ikishima | C09J 7/0246 428/156 |
| 8,365,862 | B2 * | 2/2013 | Coates | B32B 5/08 181/284 |
| 8,534,419 | B2 * | 9/2013 | Coates | B32B 37/1284 181/284 |
| 8,950,549 | B2 * | 2/2015 | Coates | B32B 37/1284 181/290 |
| 9,151,040 | B2 * | 10/2015 | Coates | B32B 5/26 |
| 2004/0122396 | A1 * | 6/2004 | Maldonado | A61F 13/512 604/383 |
| 2004/0180177 | A1 * | 9/2004 | Ray | B32B 5/02 428/86 |
| 2004/0180592 | A1 * | 9/2004 | Ray | B32B 5/02 442/38 |
| 2004/0231915 | A1 * | 11/2004 | Thompson, Jr. | B32B 5/02 181/290 |
| 2004/0238275 | A1 | 12/2004 | Keller et al. | |
| 2004/0256175 | A1 * | 12/2004 | Gnadig | B32B 3/26 181/290 |
| 2006/0090958 | A1 * | 5/2006 | Coates | G10K 11/162 181/290 |
| 2006/0137799 | A1 * | 6/2006 | Haque | B32B 5/06 156/62.2 |
| 2006/0289230 | A1 | 12/2006 | Connelly et al. | |
| 2006/0289231 | A1 * | 12/2006 | Priebe | B32B 3/266 181/290 |
| 2007/0277948 | A1 | 12/2007 | Carbo et al. | |
| 2008/0001431 | A1 * | 1/2008 | Thompson | B32B 5/26 296/187.01 |
| 2008/0166940 | A1 * | 7/2008 | Nunn | B32B 5/26 442/346 |
| 2008/0233348 | A1 | 9/2008 | Ishiwatari et al. | |
| 2008/0251187 | A1 * | 10/2008 | Haque | D04H 1/42 156/148 |
| 2009/0148644 | A1 * | 6/2009 | Francis | C09J 7/0296 428/41.8 |
| 2009/0162595 | A1 * | 6/2009 | Ko | B05C 5/0254 428/41.9 |
| 2009/0255619 | A1 * | 10/2009 | Tong | E04B 1/94 156/71 |
| 2010/0038169 | A1 | 2/2010 | Lee | |
| 2010/0168286 | A1 * | 7/2010 | Gladfelter | D21H 13/10 524/34 |
| 2011/0082386 | A1 * | 4/2011 | Sheraton, Sr. | B32B 7/12 600/559 |
| 2012/0058289 | A1 | 3/2012 | Coates et al. | |

FOREIGN PATENT DOCUMENTS

| | | | |
|---|---|---|---|
| JP | H05-113020 | 7/1993 | |
| JP | H10-156994 | 6/1998 | |
| JP | H10-273900 | 10/1998 | |
| JP | 2000-310023 | 7/2000 | |
| JP | 2004-107605 | 8/2004 | |
| JP | 2007-223273 | 6/2007 | |
| JP | 2008-68799 | 3/2008 | |
| WO | 00/32142 | 6/2000 | |
| WO | 01/19306 | 3/2001 | |
| WO | 2008/050994 A1 | 5/2008 | |
| WO | WO 2009052163 A2 * | 4/2009 | C08J 7/047 |
| WO | 2010/042995 | 4/2010 | |

OTHER PUBLICATIONS

DECI-TEX 3D, URL=http://web.archive.org/web/200700830042658http://www.inccorp.com.au/page/deci_tex_3d.html#top, including nine (9) documents from links therein, download date Aug. 26, 2011, 19 pages.

International Search Report, mailed Dec. 2, 2009, for PCT/AU2009/001363, 4 pages.

(56) References Cited

OTHER PUBLICATIONS

Extended European Search Report for European Application No. 09820112.2 dated Dec. 12. 2016.

* cited by examiner

COMPOSITE SOUND ABSORBER

TECHNICAL FIELD

The described embodiments relate generally to sound absorption materials.

BACKGROUND

Sound absorption materials are used in a variety of applications to reduce sound transmission and absorb sound at useful frequencies. Depending upon the end use applications of the material, sound absorption materials may have to meet requirements for one or more of: high sound absorption, low flammability, low toxic emissions, and ease of use.

It is desired to address or ameliorate one or more disadvantages or shortcomings associated with existing sound absorption materials or to at least provide a useful alternative thereto.

SUMMARY

Certain embodiments relate to a sound absorbing material comprising:
  a nonwoven fiber insulation material; and
  a flow resistive nonwoven facing, wherein the flow resistive nonwoven facing is bonded to the insulation material and has an air flow resistance of from about 600 to about 1800 Rayls and a surface density of from about 20 to about 150 g/m$^2$.

The composite sound absorber may have formaldehyde emissions of less than about 5 mg/kg.

The flow resistive nonwoven facing provided in certain embodiments can be used as the basis of a family of products based on a range of densities and thicknesses of the nonwoven fiber insulation material.

BRIEF DESCRIPTION OF THE DRAWINGS

Various embodiments are described herein, by way of example only, with reference to the following drawings in which.

DETAILED DESCRIPTION

Figure 1:
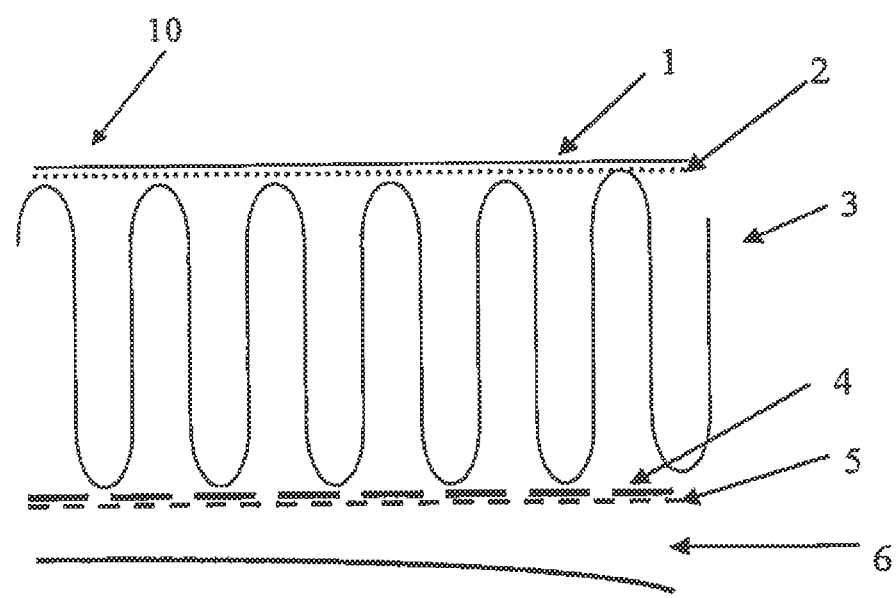
FIG. 1 is a schematic diagram illustrating a composite sound absorber.

For simplicity, the term "average fiber size" will be used herein to describe the mean fiber size of the flow resistive nonwoven facing of the composite sound absorber, so formed. The average fiber size may fall within the range of about 1.5 to 4.5 denier, more preferably about 2 to 4 denier, and even more preferably about 2.5 to 3.6 denier. The use of a flow resistive nonwoven facing with a smaller average fiber size may be desirable in applications in which it is necessary to enhance the sound absorption of the composite sound absorber further.

In some embodiments of the composite sound absorber, the flow resistive nonwoven facing has a surface density from about 20 to about 150 g/m$^2$. In some embodiments, the surface density is about 50 g/m$^2$. The flow resistive nonwoven facing has an air flow resistance of from about 600 to about 1800 Rayls, optionally from about 800 to about 1600 Rayls, and optionally from about 900 to about 1500 Rayls. Alternatively, the flow resistance may be from about 600 to 1000 Rayls or from about 800 to about 900 Rayls. The flow resistive nonwoven facing acts as a flow resistive membrane that presents an acoustic impedance to the incident sound wave, thereby increasing the sound absorption at low and mid frequencies compared with the plain substrate material that acts purely as a porous fibrous bulk absorber. High frequency sound absorption reduces unacceptably when the air flow resistance of the facing exceeds about 1800 Rayls. Low frequency sound absorption reduces unacceptably below about 600 Rayls.

In order to achieve a composite sound absorber which meets low emission standards, namely formaldehyde emissions of less than about 5 mg/kg, it may be desirable to use materials with low individual emissions. These low individual emission materials can include the fibers in the nonwoven fiber insulation material and the flow resistive nonwoven facing, any adhesive system bonding or laminating the facing to the insulation material, and any pressure sensitive adhesive backing. Each low individual emission material should exhibit low toxic emissions and a low measurement of volatile organic compounds (VOC). As shown by the test results presented herein, the described composite sound absorber can achieve formaldehyde emissions of less than 0.8 mg/kg and less than 0.4 mg/kg. Acetaldehyde emissions of 0.2 mg/kg and less can also be achieved.

To provide an acceptable flammability level, it may be necessary to treat the material used for the flow resistive nonwoven facing with a flame retardant, such as a phosphate—derived flame retardant.

The flow resistive nonwoven facing may be provided in the form of a wetlaid cellulose nonwoven textile, which herein is described as a "paper tissue". Such paper tissues are available as filter paper media, from several possible sources. However fibers other than cellulose are also suitable. Further suitable wetlaid nonwoven textiles include blends of fibers that include polyester, viscose, polyethylene, polyvinyl acetate (PVA) and other synthetic fibers. Suitable blends may also include such fibers in combination with cellulose fibers.

The fibers of the insulation material may be natural or synthetic fibers. Suitable natural fibers may include cotton, jute, wool, cellulose and ceramic fibers. Suitable synthetic fibers may include polyester, polypropylene and polyethylene fibers. In one embodiment, the insulation material comprises polyester fibers, such as polyethylene terephthalate (PET), and Co-polyester/polyester (CoPET/PET) adhesive bicomponent fibers. The fibers may be 100% virgin fibers, or may contain up to about 90% fibers regenerated from post consumer waste. The insulation material fibers may have a linear mass density from about 0.5 to about 12 denier, preferably about 1 to about 6 denier, more preferably about 1 to about 4 denier.

The insulation material fibers may be opened and blended using conventional processes. The fibers may then be formed into a nonwoven web using nonwoven processes including, for example, carding, air laying, or mechanical formation. A carded web may be cross-lapped, or vertically lapped, to form a voluminous nonwoven web. An air laid or mechanically formed web may be produced at the desired thickness and density. The web is then thermally bonded to form a cohesive nonwoven insulation material.

In some embodiments, the nonwoven fiber insulation material is formed front a carded Web. The carded web may be vertically lapped according to processes such as "Struto" or "V-Lap", for example. This construction provides a web with relative high structural integrity in the direction of the thickness of the composite sound absorber, thereby minimising the probability of the web falling apart during application, or in use. Such an arrangement also provides the ability to achieve a low density web with a relatively low bulk density.

In some embodiments, the surface density of the nonwoven fiber insulation material may be as low as 200 g/m$^2$, or as high as 800 g/m$^2$, for example. In some embodiments, the thickness may be between 4 mm and 50 mm. Increasing the density of the fibrous web does not necessarily provide additional sound absorption, as the sound absorption is largely controlled by the nonwoven facing.

In some embodiments, the fibrous web may have a relatively low bulk density of between about 10 kg/m$^3$ and 30 kg/m$^3$, and optionally between about 15 kg/m$^3$ and about 20 kg/m$^3$. At low thickness, such as at 4 mm, the practical bulk density may be as high as 50 kg/m$^3$, for example.

In some embodiments, the flow resistive nonwoven facing is laminated to one side of the nonwoven fiber insulation material. The flow resistive nonwoven facing can be laminated using a suitable conventional laminating technique. However, care must be taken to ensure that the adhesive layer does not unduly influence the air flow resistance. In order to achieve this, it may be necessary to control the adhesive deposition or application rate. In some embodiments the adhesive comprises a dry powder, heat-activated adhesive. The adhesive may be scatter-coated onto the web at a rate of approximately 30 g/m$^2$. Rates of around 8 or 10 g/m$^2$ to about 40 g/m$^2$ may also be employed. In some embodiments, the adhesive powder comprises a low density polyethylene. hi some embodiments, subsequent to the adhesive powder application, the flow resistive nonwoven facing is applied from a roll, and brought into contact with the adhesive coated insulation material, before passing the composite through a flat-bed laminator, with which contact heat is applied through moving conveyor belts.

In some embodiments, the composite sound absorber is provided with a pressure sensitive adhesive (PSA). In further embodiments the PSA may be applied from a roll and laminated to the back side of the nonwoven fiber insulation material, concurrently with the lamination of the nonwoven facing. In some embodiments, a release liner carries the PSA. Prior to installation of the composite sound absorber, the release liner will be removed from the pressure sensitive adhesive to allow the composite sound absorber to be adhered to a panel or surface. For some embodiments of the composite sound absorber intended to be used as input components, for example on a vehicle production line, it is desirable that insulation pads comprising the composite sound absorber can be installed quickly and easily. To achieve this, for some applications, it may be beneficial to provide a release liner with a high tear strength that is easy to remove.

In some embodiments, the PSA may be provided as part of a tape material comprising: a thin flexible substrate; a PSA substance carried on a single side of the substrate, the PSA substance being provided in an intermittent pattern along a length of the substrate; and optionally a mesh carried on the single side. In those embodiments, the PSA may be intermittently coated onto a silicone coated plastic or paper release liner.

The purpose of the substrate of the tape material is to act as a carrier for the PSA substance so that the PSA substance can be applied (adhered) to the sound absorbing material. The substrate further acts as the release liner and can be subsequently removed by peeling it away, leaving the PSA substance exposed on the side where the substrate used to be. The newly exposed face of the PSA substance can be applied to a target surface, for example such as a panel or surface, to adhere the composite sound absorber to the target surface.

Depending on the size and spacing of the applied portions of the intermittent PSA coating, the percentage of coated area can be varied. The applied area of the coating can vary between about 10 and about 90%, or more specifically about 30% to about 40%, of the area of the substrate, for example The intermittent coating may be applied in strips or in another pattern. This can be achieved by hot-melt coating with a slot die, for example, although it can also be achieved by coating with a patterned roller or a series of solenoid activated narrow slot coating heads, for example, and may also include water and solvent based coatings, in addition to hot-melt coating.

In embodiments where the PSA coating is applied in strips, the spacing of the strips may vary depending on the properties of the nonwoven fiber insulation material. For example, a lighter insulation material would need less PSA to hold the material in place. A wider spacing or gap between the strips can facilitate easier removal of the substrate, as a person can more readily find uncoated sections that allow an edge of the substrate to be lifted easily when it is to be peeled away to adhere the sound absorbing material to another surface.

By applying the adhesive in an intermittent pattern, such as longitudinal strips, it is possible to still achieve the coating weight desired for a particular application, while saving a large percentage of the PSA resin by coating only some portions of the total area. Thus, it may be possible to use a reduced amount of PSA substance because the sound absorbing material of certain embodiments is a lightweight and porous article that does not require an all-over coating. Lowering the overall amount of PSA used also has the effect of minimising the toxic emissions and volatile organic compounds (VOC) contributed by the PSA substance used to adhere the sound absorbing material to a target surface. The described acrylic resin used for the PSA also has relatively low VOC content.

The pressure sensitive adhesive substance may be an acrylic resin that is curable under ultraviolet light, such as AcResin type DS3583 available from BASF of Germany. A PSA substance may be applied to substrate in a thickness of about 10 to about 150 microns, for example. The thickness may alternatively be from about 20 to about 100 microns, and possibly from about 30 to about 75 microns, for example.

Other types of PSA substance and application thicknesses may be used, as well as PSA substances that can be cured under different conditions, whether as a result of irradiation or another curing method. For example, the PSA substance may comprise a hot-melt synthetic rubber-based adhesive nr a UV-curing synthetic rubber-based adhesive.

According to some embodiments, the PSA coating may be stabilised by a light weight, open mesh. The mesh may be of polyester or fiberglass, or other suitable textile or plastic material. In one example, the mesh is formed of polyester strands coated with a thermoplastic resin. The mesh may have about 7 Denier and a density of about 2.8 g/m², with a rectangular mesh spacing of about 8 mm by 12 mm. A suitable mesh may be obtained front Saint Gobain of Grand Island, N.Y. under product code KPM3210/P3A-3L.

The type, size and shape of the mesh may be varied, for example to have a more closed form (i.e. woven at smaller spacing in the warp or weft directions) to provide more support for the PSA coating. When applied to the porous nonwoven fiber insulation material, relatively narrow strips of pressure sensitive adhesive coating may tend to lift off the porous articles during removal of the substrate. The laminated mesh becomes embedded in, or adhered to, the PSA and can help to mitigate this problem.

Another function of the mesh is to provide sufficient re-enforcing strength to the PSA coating so that the substrate can be easily removed. If the mesh is more open (i.e. woven at a greater spacing in a warp or weft directions), the risk that the PSA coating will break increases and can make removal of the substrate more difficult.

As a further aid to easy removal of the release liner substrate, the substrate may have one or more slits formed therein.

The mesh of the tape material may have been laminated onto the intermittent PSA coating after slits (if any) are formed in the substrate and can be relatively integral with the adhesive coating.

Suitable tape materials include those described in co-owned U.S. provisional patent application Ser. No. 61/106,413, filed Oct. 16, 2008 and in U.S. provisional patent application Ser. No. 61/106,488, filed Oct. 17, 2008, and those described in a co-owned International patent application entitled "Tape Material and Roll Comprising Pressure Sensitive Adhesive" which claims priority from the aforementioned provisional Application. The contents of all of such applications are hereby incorporated herein by reference.

Figure 2:
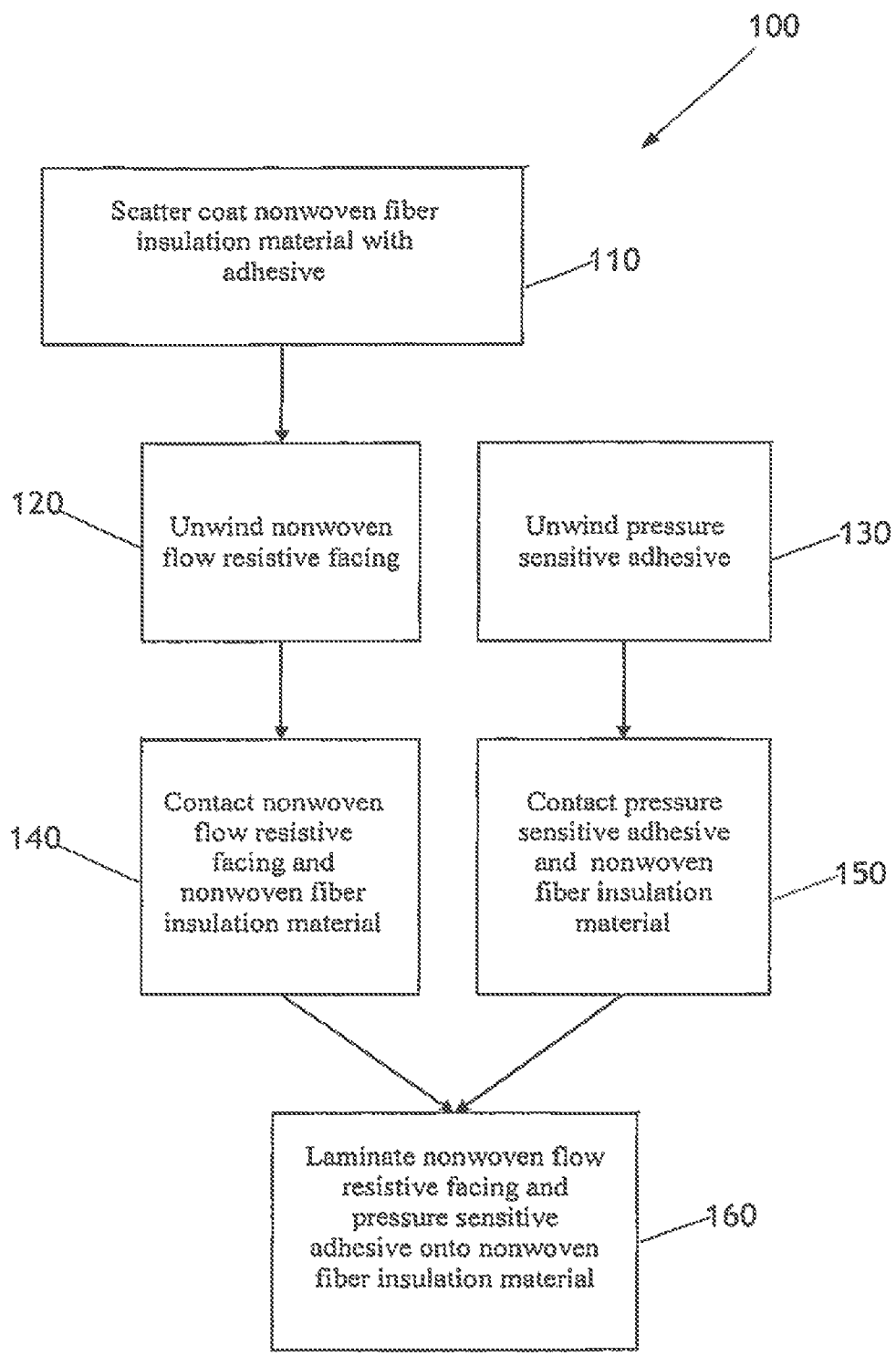
FIG. 2 is a flowchart of a process for producing a composite sound absorber.

Referring now to FIGS. 1 and 2, a composite sound absorber (10) and a process (100) for producing a composite sound absorber (10) are described in further detail. The composite sound absorber (10) may comprise a wet-laid nonwoven textile (or tissue) as the flow resistive nonwoven facing (1), which is unwound from a roll in step 120. The facing (1) is laminated to the surface of a vertically lapped, thermally bonded, nonwoven fiber insulation material (3) in step 160 after contacting the nonwoven fiber insulation material (3) in step 140. The facing (1) is adhered to the nonwoven web with a powder adhesive (2) that is scatter coated onto the nonwoven fiber insulation material (3) in step 110. A pressure sensitive adhesive (4) may be simultaneously laminated to nonwoven fiber insulation material (3) in step 160, on the side opposite to the facing (1), after contacting the nonwoven fiber insulation material (3) in step 150. The pressure sensitive adhesive (4) is pre-coated onto a release liner (6) in an intermittent pattern and is unwound from a roll in step 130. The pressure sensitive adhesive (4) may be reinforced with a light weight, open polyester or fiberglass mesh (5), and the release liner (6) may be longitudinally slit at regular intervals in the cross direction.

The described embodiments are illustrated farther by, but are not limited to, the following examples.

Example 1

A composite sound absorber was produced with the same structure as shown and described in relation to FIG. 1. A 50 g/m² cellulose wet-laid nonwoven textile (or tissue) flow resistive nonwoven facing (1) was laminated to the surface of a 400 g/m², vertically lapped, 12 mm thick thermally bonded nonwoven fiber insulation material (3) comprising 30% 2 denier bicomponent polyester adhesive fibers, 10% 12 denier spiral hollow staple fiber, and 60% regenerated 3 denier polyester staple fiber. The insulation material has an average fiber size of about 3.6 denier.

The facing (1) was adhered to the nonwoven web with a low density polyethylene (LDPE) powder adhesive (2) that was scatter coated onto the nonwoven web. A LTV-cured acrylic pressure sensitive adhesive (4) coated onto a 40 micron medium density polyethylene (MDPE) release liner (6) in a striped pattern was simultaneously laminated to the other side. The pressure sensitive adhesive was reinforced with an open polyester mesh (5), and the release liner was slit at regular intervals.

Figure 3:
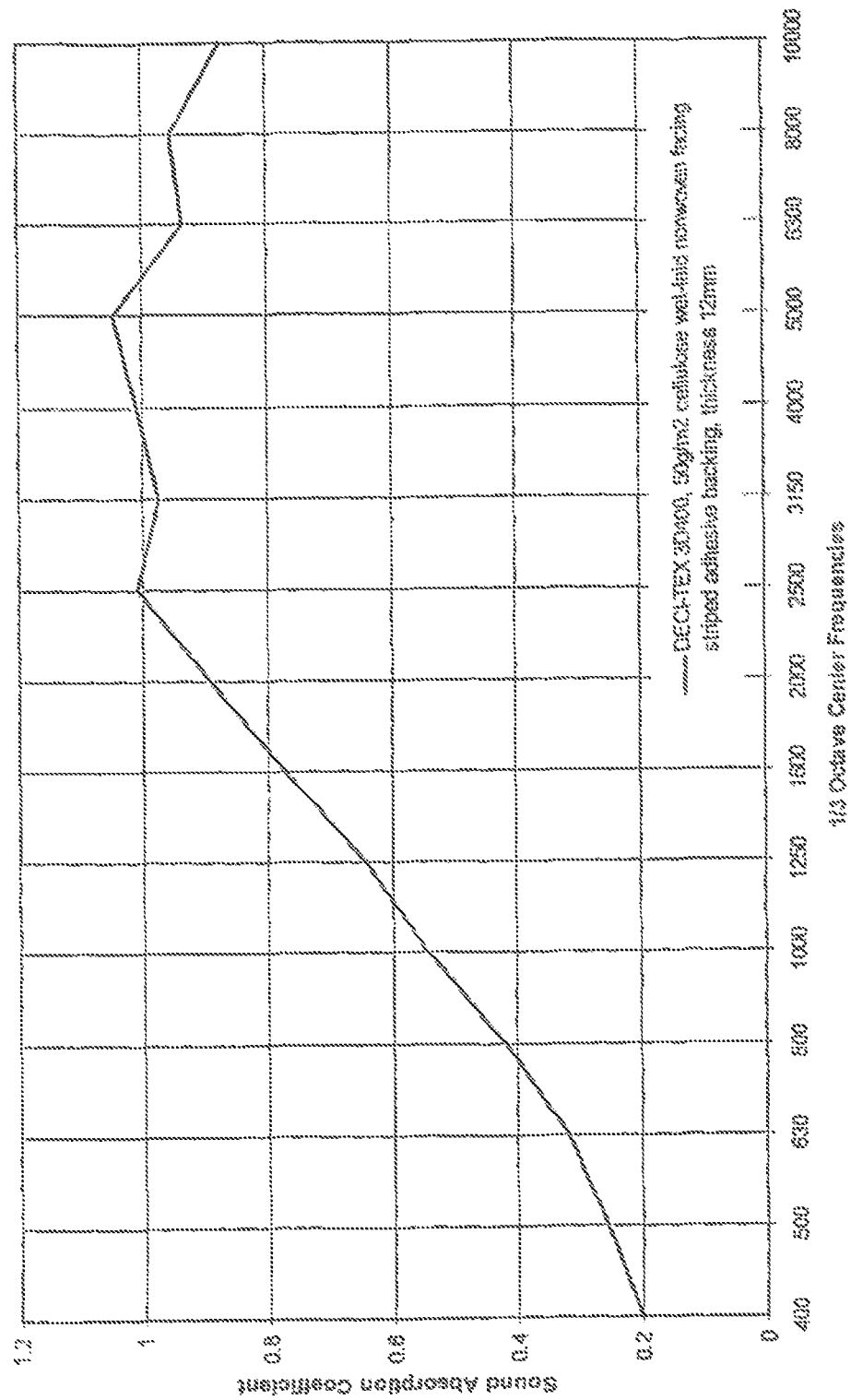
FIG. 3 is a graph of random incidence sound absorption sound testing results for Example 1.

The composite sound absorber was tested for random incidence sound absorption in a Reiter alpha cabin. The results of the sound testing are shown in FIG. 3.

The composite sound absorber was also tested for emissions and the results are shown in Table 1.

TABLE 1

Emissions
Moisture content: 1.26 mass-%

|  | Acetaldehyde [mg/kg] | Formaldehyde [mg/kg] |
|---|---|---|
| Mean value | 0.13 | 0.73 |
| Test 1: | 0.2 | 0.74 |
| Test 2: | 0.1 | 0.67 |
| Test 3: | 0.1 | 0.78 |
| Limit of quantitation | 0.1 | 0.1 |

The composite sound absorber was tested for flammability in accordance with Federal Motor Vehicle Safety Standard (FMVSS) 302, and returned a best result of self-extinguishing, with a best burn rate of 80 mm/minute.

Example 2

Figure 4:
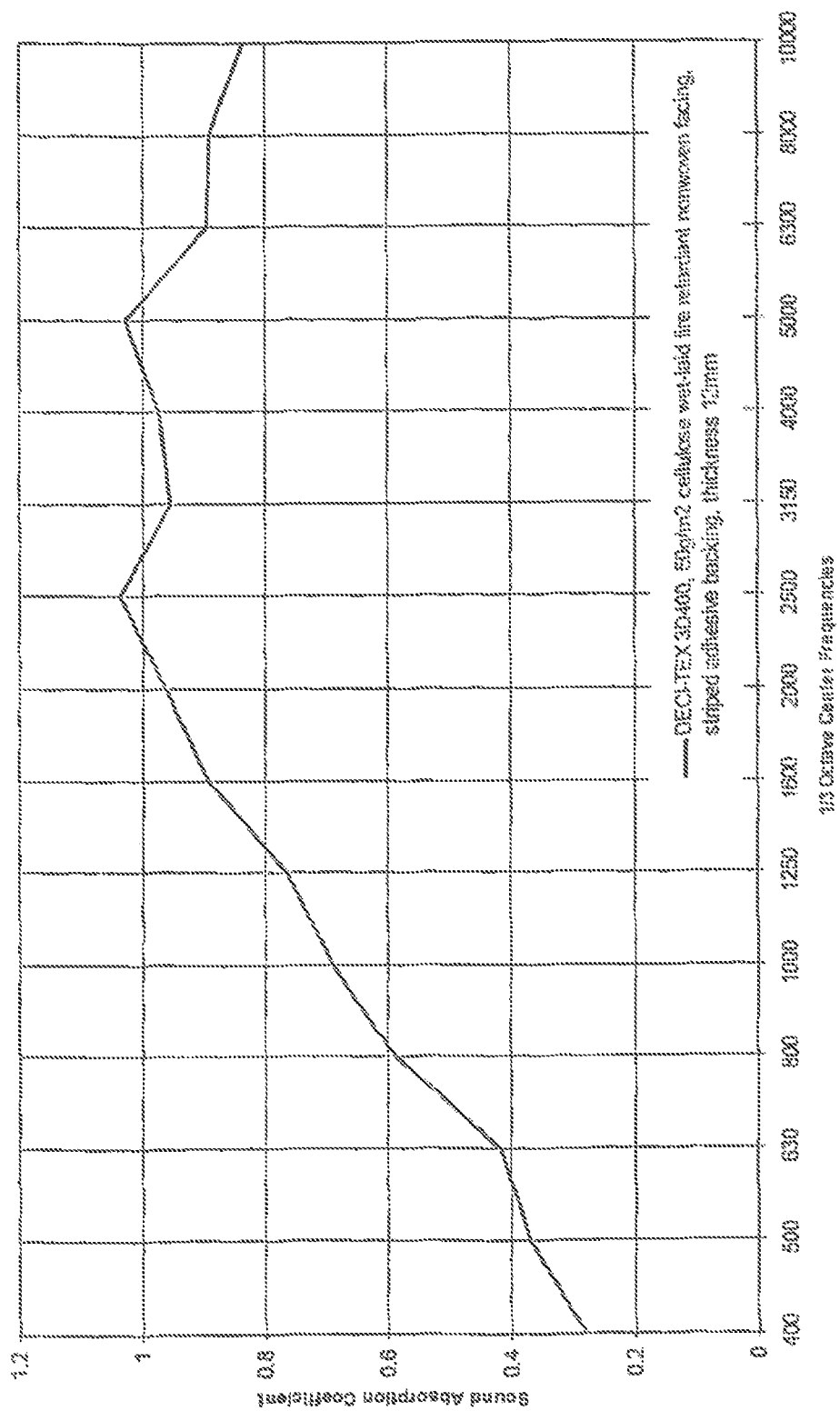
FIG. 4 is a graph of random incidence sound absorption sound testing results for Example 2.

A second sample was prepared as per example 1 except that the tissue was treated with a water based flame retardant. The emissions testing are shown in Table 2 below. The sound absorption results are plotted in FIG. 4.

|  | Acetaldehyde [mg/kg] | Formaldehyde [mg/kg] |
|---|---|---|
| Mean value | <0.1 | 0.34 |
| Test 1: | <0.1 | 0.35 |
| Test 2: | <0.1 | 0.32 |
| Test 3: | <0.1 | 0.35 |
| Limit of quantitation | 0.1 | 0.1 |

The composite of Example 2 was tested for flammability in accordance with FMVSS 302, and recorded a result of burn rate varying between 80-90 mm/m.

Example 3

Figure 5:
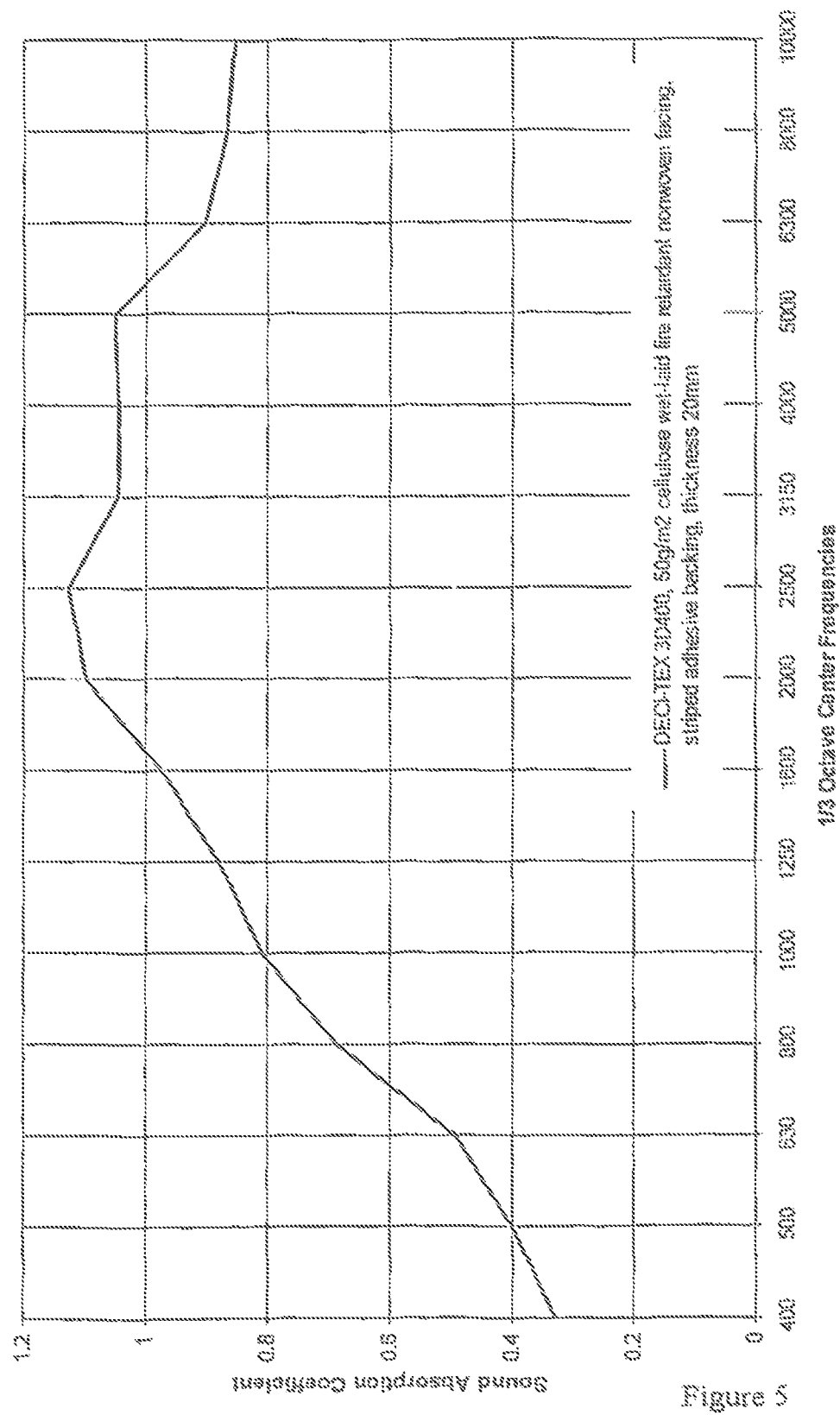
FIG. 5 is a graph of random incidence sound absorption sound testing results for Example 3.

A third sample was prepared as per Example 2, except that the thickness of the sample was 20 mm. Sound absorption test results are shown in FIG. 5.

The composite was tested for flammability in accordance with FMVSS 302 and recorded a result of burn rate varying between 60-90 mm/m.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

Embodiments have been described herein with reference to the figures and examples. However, some modifications to the described embodiments and/or examples may be made without departing from the spirit and scope of the described embodiments, as described in the appended claims.

The invention claimed is:

1. A sound absorbing material comprising:
   a nonwoven fibrous acoustic insulation material comprising a fibrous web formed by air laying or carding; and
   a flow resistive nonwoven facing,
   wherein the flow resistive nonwoven facing is bonded to the insulation material by a powderized adhesive, and
   wherein the flow resistive nonwoven facing has an average fiber size of about 1.5 to about 4.5 denier to enhance the sound absorption of the sound absorbing material.

2. The sound absorbing material of claim 1, wherein the sound absorbing material has formaldehyde emissions of less than about 5 mg/kg.

3. The sound absorbing material of claim 1 further comprising a tape material adhered to the insulation material on an opposite side to the flow resistive nonwoven facing.

4. The sound absorbing material of claim 3, wherein the tape material comprises:
   a thin flexible substrate;
   a pressure sensitive adhesive (PSA) substance carried on a single side of the substrate, the PSA substance being provided in an intermittent pattern along a length of the substrate;
   wherein the PSA adheres the tape material to the insulation material.

5. The sound absorbing material of claim 4, further comprising a mesh carried on the single side.

6. The sound absorbing material of claim 4, wherein the substrate is silicone coated and comprises a plastic film release liner or a paper-based release liner.

7. The sound absorbing material of claim 4, wherein the substrate comprises one or more slits formed therein intermediate at least one pair of PSA strips.

8. The sound absorbing material of claim 1, wherein the powderized adhesive comprises low density polyethylene.

9. The sound absorbing material of claim 1, wherein the powderized adhesive is scatter-coated onto the insulation material at a rate of about 10 to about 40 $g/m^2$.

10. The sound absorbing material of claim 1, wherein the powderized adhesive is heat-activated.

11. The sound absorbing material of claim 1, wherein the flow resistive nonwoven facing is treated with a phosphate-derived flame retardant.

12. The sound absorbing material of claim 1, wherein the insulation material comprises a vertically-lapped thermally bonded fibrous web.

13. The sound absorbing material of claim 1, wherein the sound absorbing material has a flow resistance of from about 600 to about 1000 Rayls.

14. The sound absorbing material of claim 13, wherein the flow resistance is from about 800 to about 900 Rayls.

15. The sound absorbing material of claim 1, wherein the flow resistive nonwoven facing has a surface mass of about 40 to about 60 $g/m^2$.

16. The sound absorbing material of claim 1, wherein the flow resistive nonwoven facing comprises a cellulose wet-laid nonwoven textile.

* * * * *